(12) United States Patent
Valeri et al.

(10) Patent No.: US 10,086,754 B1
(45) Date of Patent: Oct. 2, 2018

(54) SYSTEM AND METHOD FOR CONTROLLING A SPEAKER IN VEHICLE CABIN TO PLAY SOUNDS PRODUCED BY AN ENGINE AND/OR A DRIVELINE DURING A VEHICLE LAUNCH AND A TRANSMISSION UPSHIFT

(71) Applicant: GM Global Technology Operations LLC, Detroit, MI (US)

(72) Inventors: Frank C. Valeri, Novi, MI (US); Scott M. Reilly, Southfield, MI (US); Roger C. Barlow, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/472,973

(22) Filed: Mar. 29, 2017

(51) Int. Cl.
| | |
|---|---|
| *H04B 1/00* | (2006.01) |
| *B60Q 5/00* | (2006.01) |
| *H04R 3/04* | (2006.01) |

(52) U.S. Cl.
CPC ............ *B60Q 5/008* (2013.01); *H04R 3/04* (2013.01); *H04R 2499/13* (2013.01); *Y10S 903/904* (2013.01)

(58) Field of Classification Search
USPC .......................................................... 381/86
See application file for complete search history.

(56) References Cited

U.S. PATENT DOCUMENTS

| | | | |
|---|---|---|---|
| 7,979,147 B1* | 7/2011 | Dunn ................. | G10K 15/02 181/192 |
| 8,938,079 B2 | 1/2015 | Valeri et al. | |
| 9,218,801 B2 | 12/2015 | Reilly et al. | |
| 9,227,566 B2 | 1/2016 | Valeri et al. | |
| 9,365,158 B2 | 6/2016 | Barlow, Jr. et al. | |
| 9,388,776 B2 | 7/2016 | Valeri et al. | |
| 9,725,035 B2* | 8/2017 | Konet ................. | B60Q 5/008 |
| 2010/0166210 A1* | 7/2010 | Isozaki .............. | B60L 3/00 381/86 |
| 2010/0208915 A1* | 8/2010 | Lipp .................. | G10K 15/02 381/86 |
| 2012/0106748 A1* | 5/2012 | Peachey ............. | B60Q 5/00 381/61 |

(Continued)

OTHER PUBLICATIONS

U.S. Appl. No. 15/245,331, filed Aug. 24, 2016, Valeri et al.
U.S. Appl. No. 15/245,400, filed Aug. 24, 2016, Valeri et al.

*Primary Examiner* — James Mooney (57) ABSTRACT

A system according to the present disclosure includes a launch identification module and a speaker control module. The launch identification module is configured to monitor a speed of a vehicle and identify a vehicle launch when the vehicle speed increases from zero to a value greater than zero. The speaker control module is configured to monitor an acceleration of the vehicle control a speaker in a cabin of the vehicle to play a first sound that simulates a sound produced by at least one of an engine and a driveline during a vehicle launch when a vehicle launch is identified and the vehicle acceleration is greater than a predetermined acceleration. The speaker control module is also configured to control the speaker to not play the first sound during a vehicle launch when a vehicle launch is identified and the vehicle acceleration is less than or equal to the predetermined acceleration.

20 Claims, 3 Drawing Sheets

(56) References Cited

U.S. PATENT DOCUMENTS

| | | | | |
|---|---|---|---|---|
| 2012/0109489 A1* | 5/2012 | Valeri | ............... | G10K 15/02 |
| | | | | 701/102 |
| 2013/0214920 A1* | 8/2013 | Konet | ............... | B60Q 5/008 |
| | | | | 340/466 |
| 2014/0229076 A1* | 8/2014 | Doering | ............ | F16H 63/42 |
| | | | | 701/48 |

* cited by examiner

SYSTEM AND METHOD FOR CONTROLLING A SPEAKER IN VEHICLE CABIN TO PLAY SOUNDS PRODUCED BY AN ENGINE AND/OR A DRIVELINE DURING A VEHICLE LAUNCH AND A TRANSMISSION UPSHIFT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for controlling the speaker in a vehicle cabin to play sounds produced by an engine and/or a driveline during a vehicle launch and a transmission upshift.

When a vehicle having a high performance engine and driveline launches from zero to a speed greater than zero, the high performance engine and driveline produce a grunt sound. The high performance engine and the driveline also produce a grunt sound when the vehicle is upshifted (i.e., shifted from a lower gear to a higher gear). The grunt sounds produced by the high performance engine and driveline during a vehicle launch and a transmission upshift may affect a customers perception of powertrain performance. For example, the grunt sounds produced by the high performance engine and driveline during a vehicle launch and a transmission upshift may be more desirable to a customer than the sounds produce by a regular engine and driveline during these events.

Modern vehicles include various sound reduction features that reduce the amount of noise produced by engines and drivelines during vehicle launches and vehicle upshifts. For example, improvements in engine torque shaping, induction system designs, exhaust system designs, and powertrain mounts have reduced engine and driveline noise. In addition, modern vehicle cabins include sound insulating features (e.g., padding) that further reduce the amount of engine and driveline noise heard by customers. Thus, while the performance of a newer engine may be the same as or better than the performance of an older engine, a customer may perceive that the newer engine does not perform as well as the older engine due to the noise reduction. In addition, electric vehicles and hybrid electric vehicles are propelled by an electric motor only, at least at certain times, and therefore do not make a grunt sound at all during vehicle launches and vehicle upshifts. Thus, a customer may incorrectly perceive that these vehicles have low power performance.

SUMMARY

A system according to the present disclosure includes a launch identification module and a speaker control module. The launch identification module is configured to monitor a speed of a vehicle and identify a vehicle launch when the vehicle speed increases from zero to a value greater than zero. The speaker control module is configured to monitor an acceleration of the vehicle control a speaker in a cabin of the vehicle to play a first sound that simulates a sound produced by at least one of an engine and a driveline during a vehicle launch when a vehicle launch is identified and the vehicle acceleration is greater than a predetermined acceleration. The speaker control module is also configured to control the speaker to not play the first sound during a vehicle launch when a vehicle launch is identified and the vehicle acceleration is less than or equal to the predetermined acceleration.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure controls one or more speakers in a cabin of a vehicle to play sounds caused by an engine and/or a driveline during a vehicle launch and a transmission upshift. For vehicles that have an engine and driveline, the sounds played by the speakers may enhance the sounds caused by the engine and driveline during these events. For example, the sounds played by the speakers may be the sounds that would be produced by the engine and the driveline but for the sound reduction features included in the vehicle. For vehicles that operate using an electric motor only, the sounds played by the speakers may be the only engine and driveline noise heard by the customer during these events. In addition, the sounds played by the speakers may be the sounds that a customer would expect to hear if the electric or hybrid electric vehicle had a high performance engine and driveline.

The system and method monitors one or more vehicle operating conditions and identifies when a vehicle launch or a transmission upshift occurs based on the vehicle operating conditions. The vehicle operating conditions include transmission gear state, vehicle speed, vehicle acceleration, powertrain torque, engine speed, transmission shift status, and/or transmission gear shift direction. When a vehicle launch or a transmission upshift is identified, the system and method controls the speakers to play the type and duration of engine and driveline sounds that a customer may expect or desire to hear during these events.

Figure 1:
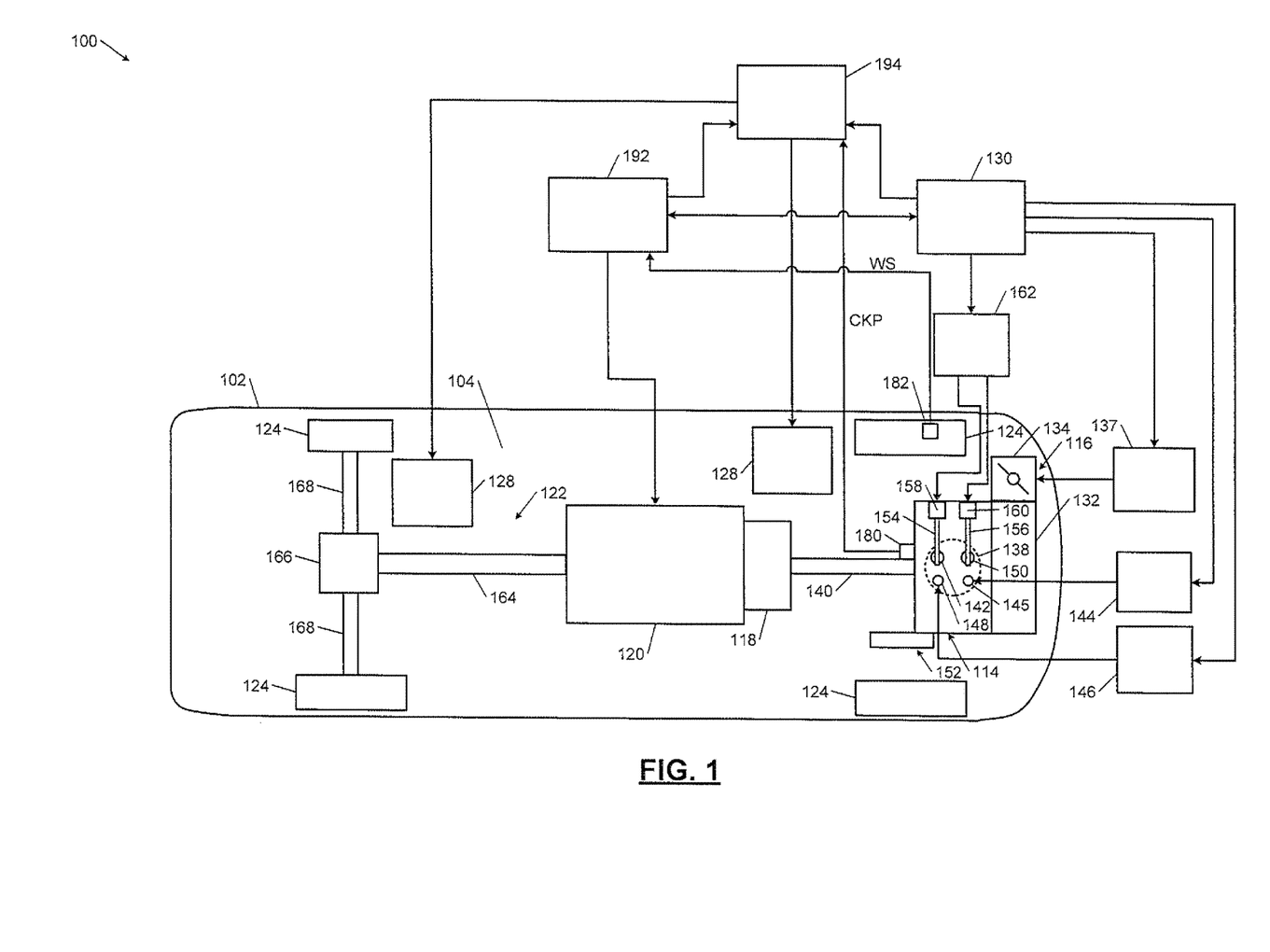
FIG. 1 is a functional block diagram of an example vehicle according to the principles of the present disclosure.

Referring now to FIG. 1, a vehicle 100 includes a vehicle body 102 enclosing a vehicle cabin 104, an engine 114, an intake system 116, a torque converter 118, a transmission 120, a driveline 122, wheels 124, and one or more speakers 128. The engine 114 combusts an air/fuel mixture to produce drive torque for the vehicle 100. An engine control module (ECM) 130 adjusts the amount of drive torque produced by the engine 114 based on a driver input. The driver input may be a signal indicating a position of an accelerator pedal. Additionally or alternatively, the driver input may be a signal generated by an adaptive cruise control system that varies vehicle speed to maintain a predetermined following distance.

Air is drawn into the engine 114 through the intake system 116. The intake system 116 includes an intake manifold 132 and a throttle valve 134. The throttle valve 134 may include a butterfly valve having a rotatable blade. The ECM 130 controls a throttle actuator module 137, which regulates opening of the throttle valve 134 to control the amount of air drawn into the intake manifold 132.

Air from the intake manifold 132 is drawn into cylinders of the engine 114. While the engine 114 may include multiple cylinders, for illustration purposes a single representative cylinder 138 is shown. For example only, the engine 114 may include 2, 3, 4, 5, 6, 8, 10, and/or 12 cylinders. The ECM 130 may deactivate some of the cylinders, which may improve fuel economy under certain engine operating conditions.

The engine 114 may operate using a four-stroke cycle. The four strokes, described below, are named the intake stroke, the compression stroke, the combustion stroke, and the exhaust stroke. During each revolution of a crankshaft 140, two of the four strokes occur within the cylinder 138. Therefore, two crankshaft revolutions are necessary for the cylinder 138 to experience all four of the strokes.

During the intake stroke, air from the intake manifold 132 is drawn into the cylinder 138 through an intake valve 142. The ECM 130 controls a fuel actuator module 144, which regulates fuel injections performed by a fuel injector 145 to achieve a desired air/fuel ratio. Fuel may be injected into the intake manifold 132 at a central location or at multiple locations, such as near the intake valve 142 of each of the cylinders. In various implementations, fuel may be injected directly into the cylinders or into mixing chambers associated with the cylinders. The fuel actuator module 144 may halt injection of fuel to cylinders that are deactivated.

The injected fuel mixes with air and creates an air/fuel mixture in the cylinder 138. During the compression stroke, a piston (not shown) within the cylinder 138 compresses the air/fuel mixture. The engine 114 may be a compression-ignition engine, in which case compression in the cylinder 138 ignites the air/fuel mixture. Alternatively, the engine 114 may be a spark-ignition engine, in which case a spark actuator module 146 energizes a spark plug 148 to generate a spark in the cylinder 138 based on a signal from the ECM 130, which ignites the air/fuel mixture. The timing of the spark may be specified relative to the time when the piston is at its topmost position, referred to as top dead center (TDC).

The spark actuator module 146 may be controlled by a spark timing signal specifying how far before or after TDC to generate the spark. Because piston position is directly related to crankshaft rotation, operation of the spark actuator module 146 may be synchronized with crankshaft angle. In various implementations, the spark actuator module 146 may halt provision of spark to deactivated cylinders.

Generating the spark may be referred to as a firing event. The spark actuator module 146 may have the ability to vary the timing of the spark for each firing event. The spark actuator module 146 may even be capable of varying the spark timing for a next firing event when the spark timing signal is changed between a last firing event and the next firing event. In various implementations, the engine 114 may include multiple cylinders and the spark actuator module 146 may vary the spark timing relative to TDC by the same amount for all cylinders in the engine 114.

During the combustion stroke, combustion of the air/fuel mixture drives the piston down, thereby driving the crankshaft 140. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 150. The byproducts of combustion are exhausted from the vehicle via an exhaust system 152.

The intake valve 142 may be controlled by an intake camshaft 154, while the exhaust valve 150 may be controlled by an exhaust camshaft 156. In various implementations, multiple intake camshafts (including the intake camshaft 154) may control multiple intake valves (including the intake valve 142) for the cylinder 138 and/or may control the intake valves (including the intake valve 142) of multiple banks of cylinders (including the cylinder 138). Similarly, multiple exhaust camshafts (including the exhaust camshaft 156) may control multiple exhaust valves for the cylinder 138 and/or may control exhaust valves (including the exhaust valve 150) for multiple banks of cylinders (including the cylinder 138).

The time at which the intake valve 142 is opened may be varied with respect to piston TDC by an intake cam phaser 158. The time at which the exhaust valve 150 is opened may be varied with respect to piston TDC by an exhaust cam phaser 160. A valve actuator module 162 may control the intake and exhaust cam phasers 158, 160 based on signals from the ECM 130. When implemented, variable valve lift may also be controlled by the valve actuator module 162.

The valve actuator module 162 may deactivate the cylinder 138 by disabling opening of the intake valve 142 and/or the exhaust valve 150. The valve actuator module 162 may disable opening of the intake valve 142 by decoupling the intake valve 142 from the intake cam phaser 158. Similarly, the valve actuator module 162 may disable opening of the exhaust valve 150 by decoupling the exhaust valve 150 from the exhaust cam phaser 160. In various implementations, the valve actuator module 162 may control the intake valve 142 and/or the exhaust valve 150 using devices other than camshafts, such as electromagnetic or electrohydraulic actuators.

The ECM 130 adjusts the position of the throttle valve 134, the amount and/or timing of fuel injections performed by the fuel injector 145, the timing at which spark is generated by the spark plug 148, and/or the timing at which the intake and exhaust valves 142 and 150 are opened to achieve a desired torque output of the engine 114. The ECM 130 determines the desired engine torque based on the driver input.

Torque output at the crankshaft 140 is transferred through the torque converter 118, through the transmission 120, through the driveline 122, and to the wheels 124. The driveline 122 includes a drive shaft 164, a differential 166, and axle shafts 168. The torque converter 118, the transmission 120, and the differential 166 amplify engine torque by several gear ratios to provide axle torque at the axle shafts 168. The axle torque rotates the wheels 124, which causes the vehicle 100 to accelerate in a forward or rearward direction.

The vehicle 100 also includes various sensors that measure operating conditions of the vehicle 100. A crankshaft position (CKP) sensor 180 is mounted proximate to the crankshaft 140 and measures the angular position of the crankshaft 140. A wheel speed (WS) sensor 182 is mounted to one or more of the wheels 124 and measures the speed of the wheels 124.

A transmission control module (TCM) 192 shifts gears of the transmission 120 based on operating conditions of the vehicle 100 and a predetermined shift schedule. The operating conditions may include the speed of the vehicle 100, a desired acceleration of the vehicle 100, and/or a desired torque output of the engine 114. The TCM 192 may determine the vehicle speed based on the wheel speed from the WS sensor 182. The TCM 192 may receive the desired vehicle acceleration and/or the desired engine torque from the ECM 130. The ECM 130 may communicate with the TCM 192 to coordinate shifting gears in the transmission 120. For example, the ECM 130 may reduce engine torque during a gear shift.

The speakers 128 are disposed within the vehicle cabin 104. Thus, sounds played by the speakers 128 may be heard by occupants within the vehicle cabin 104. An audio control module (ACM) 194 controls the speakers 128 to play a sound that simulates sounds produced by an engine and/or a driveline during a vehicle launch and a transmission upshift. The sounds played by the speakers 128 may be the sounds produced by the engine 114 and the driveline 122 during these events or the sounds produced by the same or a similar type of engine and driveline during these events.

Although the vehicle 100 is depicted as a vehicle that is driven by an engine alone, the vehicle 100 may be driven by electric motor alone. Alternatively, the vehicle 100 may be a hybrid vehicle that is driven by both an engine and an electric motor. If the vehicle 100 includes an engine, the sounds played by the speakers 128 during a vehicle launch and a transmission upshift may enhance the sounds produced by the engine 114 and the driveline 122 during these events. If the vehicle 100 does not include an engine, the sounds played by the speakers 128 during a vehicle launch and a transmission upshift may be the only sounds representing sounds produced by an engine and a driveline during these events.

Figure 2:
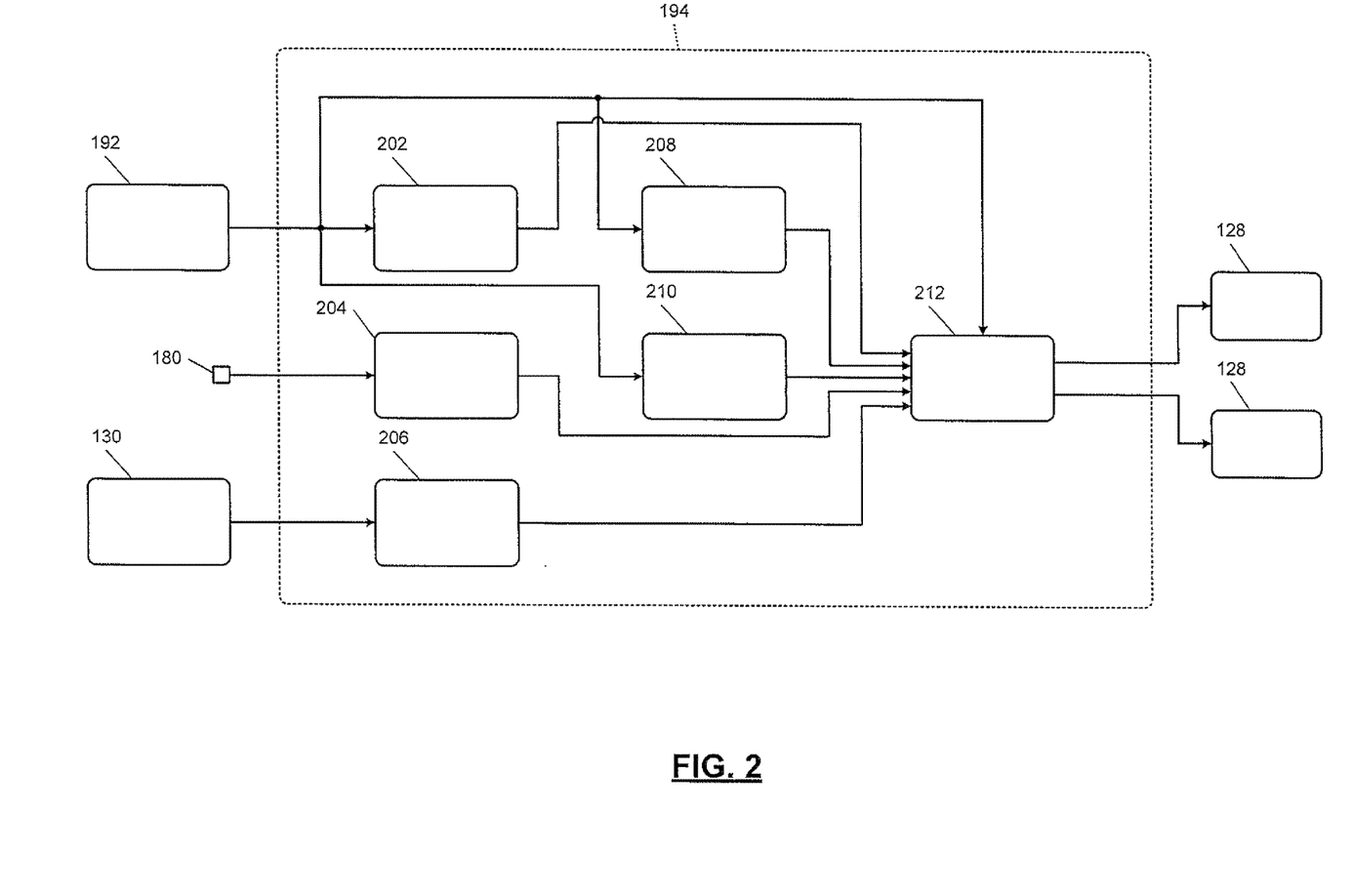
FIG. 2 is a functional block diagram of an example control system according to the principles of the present disclosure.

Referring now to FIG. 2, an example implementation of the ACM 194 includes a vehicle acceleration module 202, an engine speed module 204, a powertrain torque module 206. The vehicle acceleration module 202 determines an acceleration (or deceleration) of the vehicle 100 and outputs the vehicle acceleration. The vehicle acceleration module 202 may determine vehicle acceleration based on a vehicle speed output by the TCM 192. The TCM 192 may determine the vehicle speed based on the wheel speed from the WS sensor 182.

The engine speed module 204 determines the speed of the engine 114. The engine speed module 204 may determine the engine speed based on the crankshaft position from the CKP sensor 180. If the vehicle 100 does not include an engine, the engine speed module 204 may determine a virtual engine speed based on vehicle operating conditions. The operating conditions may include the vehicle speed and the current gear of the transmission 120. The engine speed module 204 may receive the vehicle speed and the transmission gear from the TCM 192. The engine speed module 204 outputs the engine speed (or the virtual engine speed).

The powertrain torque module 206 estimates the amount of torque produced by the powertrain of the vehicle 100 and outputs the powertrain torque. The powertrain of the vehicle 100 may include the engine 114 and/or an electric motor (not shown). The powertrain torque module 206 may estimate the amount of torque produced by the engine 114 based on a throttle position, a fuel injection timing amount, and/or a spark timing commanded by the ECM 130. The powertrain torque module 206 may estimate the amount of torque produced by the electric motor based on an input from a motor control module (not shown) that controls the electric motor. For example, motor control module may output a desired motor torque, and the powertrain control module 206 may set the estimated motor torque equal to the desired motor torque.

The example implementation of the ACM 194 further includes a launch identification module 208, an upshift identification module 210, and a speaker control module 212. The launch identification module 208 identifies when the vehicle 100 launches from a stop to a speed greater than zero. The launch identification module 208 may identify a vehicle launch based on the vehicle speed. For example, the launch identification module 208 may identify a vehicle launch when the vehicle speed increases from zero to a speed greater than zero. The launch identification module 208 may receive the vehicle speed from the TCM 192. The launch identification module 208 outputs a signal indicating when a vehicle launch is identified.

The upshift identification module 210 identifies when the transmission 120 is upshifted from a lower gear to a higher gear, or is about to be upshifted from a lower gear to a higher gear, and outputs a signal indicating when a transmission upshift is identified. For example, the upshift identification module 210 may identify a transmission upshift when the transmission 120 is shifted from first gear to second gear. The upshift identification module 210 may identify a transmission upshift based on operating conditions of the transmission 120. The transmission operating conditions may include a gear state, shift status, and/or a gear shift direction. The upshift identification module 210 may receive the transmission operating conditions from the TCM 192.

The gear state indicates which gear the transmission 120 is currently in. For example, if the transmission 120 is a four-speed transmission, the gear state may be first gear, second gear, third gear, or fourth gear. The shift status indicates the status of a commanded shift. For example, the shift status may be pending when the commanded shift is not yet been executed, the shift status may be active when the commanded shift is being executed, and the shift status may be complete when the commanded shift has been executed. The TCM 192 may determine the gear state and the shift status based on an elapsed time after the TCM 192 commands a shift and/or a measured position of gears within the transmission 120. For example, the TCM 192 may determine that a shift is pending when the elapsed time since the shift was commanded is less than a first predetermined time, the TCM 192 may determine that the shift is active when the elapsed time greater than the first predetermined time and less than a second predetermined time, and determine that the shift is complete when the elapsed time is greater than the second predetermined time. The gear shift direction indicates whether the commanded shift is an upshift or a downshift.

When a vehicle launch is identified, the speaker control module 212 controls the speakers 128 to play a first sound that simulates sounds produced by an engine and/or a driveline during a vehicle launch. In various implementations, the speaker control module 212 only controls the speakers 128 to play the first sound when a vehicle launch is identified if one or more operating conditions of the vehicle 100 satisfy certain criteria. For example, the speaker control module 212 may control the speakers 128 to play the first sound when a vehicle launch is identified and the vehicle acceleration is greater than a first predetermined acceleration. A vehicle acceleration that is greater than the first predetermined acceleration may correspond to an aggressive vehicle launch. In another example, the speaker control module 212 may control the speakers 128 to play the first sound when a vehicle launch is identified and the gear state from the TCM 192 indicates that the transmission 120 is in first gear or second gear.

In another example, the speaker control module 212 controls the speakers 128 to play the first sound when a vehicle launch is identified and the engine speed (or virtual engine speed) is within a predetermined range. The predetermined range may correspond to an aggressive vehicle launch. In one example, the predetermined range is from 3,000 revolutions per minute (RPM) to 6,000 RPM.

In another example, the speaker control module 212 determines whether to control the speakers 128 to play the first sound independent of engine speed (or virtual engine speed). To this end, the speaker control module 212 may control the speakers 128 to play the first sound when a vehicle launch is identified regardless of the engine speed when the vehicle acceleration is greater than a second predetermined acceleration. The second predetermined acceleration may be greater than or equal to the first predetermined acceleration.

In another example, the speaker control module 212 controls the speakers 128 to play the first sound when a vehicle launch is identified and the powertrain torque is greater than a predetermined torque such as a torque between 300 Newton-meters (Nm) and 600 Nm. The speaker control module 212 may only control the speakers 128 to play the first sound when a vehicle launch is identified if one or more of the above criteria are satisfied. For example, the speaker control module 212 may only control the speakers 128 to play the first sound when a vehicle launch is identified if the transmission 120 is in first gear or second gear, the engine speed is within the predetermined range, and/or the powertrain torque is greater than the predetermined torque.

The speaker control module 212 controls the speakers 128 to play a second sound that simulates sounds produced by an engine and/or a driveline during a period following a transmission upshift when a transmission upshift is identified. In various implementations, the speaker control module 212 only controls the speakers 128 to play the second sound when a transmission upshift is identified if one or more operating conditions of the vehicle 100 satisfy certain criteria. For example, the speaker control module 212 may refrain from controlling the speakers 128 to play the second sound when a transmission upshift is identified until the identified upshift is complete. For example, if the upshift identification module 210 identifies that the transmission is being upshifted from first gear to second gear (i.e., the status of the upshift from first gear to second gear is pending or active), the speaker control module 212 may not play the second sound until the upshift from first gear to second gear has been executed (i.e., the status of the upshift from first gear to second gear is complete).

In another example, the speaker control module 212 controls the speakers 128 to play the second sound when a transmission upshift is identified and the vehicle speed is less than a predetermined speed. For example, the predetermined speed may be a speed between 30 kilometers per hour (kph) and 80 kph. The speaker control module 212 may select the predetermined speed from a plurality of predetermined speeds based on the gear state of the transmission 120. For example, the speaker control module 212 may set the predetermined speed to 30 kph when the transmission 120 is in first gear, and the speaker control module 212 may set the predetermined speed to 50 kph when the transmission 120 is in second gear.

In another example, the speaker control module 212 controls the speakers 128 to play the second sound when a transmission upshift is identified and the gear state or number of the transmission 120 is less than a gear number threshold. The gear number threshold may be third gear or fourth gear. The speaker control module 212 may select the gear number threshold based on the total number of gears in (or speeds of) the transmission 120, whether the transmission 120 is a manual or automatic transmission, and/or whether the transmission 120 is a dual clutch transmission.

In another example, the speaker control module 212 controls the speakers 128 to play the second sound when a transmission upshift is identified and the engine speed is within a predetermined range. The speaker control module 212 may adjust the predetermined range based on a predetermined relationship between the gear state of the transmission 120 and the predetermined range. For example, the predetermined range may be from 2,500 RPM to 4,500 RPM when the transmission 120 is in third gear after being upshifted from second gear.

In another example, the speaker control module 212 controls the speakers 128 to play the second sound when a transmission upshift is identified and the powertrain torque is greater than a predetermined torque such as a torque between 300 Nm and 600 Nm. The speaker control module 212 may only control the speakers 128 to play the second sound when a transmission upshift is identified if one or more of the above criteria are satisfied. For example, the speaker control module 212 may only control the speakers 128 to play the second sound when a transmission upshift is identified if the identified upshift is complete, the vehicle speed is less than the predetermined speed, the current gear number is less than the gear number threshold, the engine speed is within the predetermined range, and/or the powertrain torque is greater than the predetermined torque.

The speaker control module 212 may control the speakers 128 to play each of the first and second sounds for a predetermined period such as a period between 1.5 seconds and 2 seconds. The speaker control module 212 may stop playing the first sound when the predetermined period expires and/or when one or more conditions used to identify a vehicle launch are no longer satisfied. For example, the speaker control module 212 may stop playing the first sound when the vehicle acceleration is less than the first predetermined acceleration. The speaker control module 212 may stop playing the second sound when the predetermined period expires and/or when one or more conditions used to identify a transmission upshift are no longer satisfied. For example, the speaker control module 212 may stop playing the second sound when the transmission upshift is complete.

The speaker control module 212 may select each of the first and second sounds from a plurality of predetermined sounds based on vehicle operating conditions. The vehicle operating conditions may include the gear state, the vehicle speed, the powertrain torque, the engine speed, and/or the vehicle acceleration. In addition, the second sound may be specific to the particular transmission upshift that is executed. For example, the speaker control module 212 may control the speakers 128 to play one sound when the transmission 120 is upshifted from first to second, and another sound when the transmission is upshifted from second to third.

The first and second sounds may be the sounds produced by the engine 114 and the driveline 122 during a vehicle launch and a transmission upshift, respectively, or the sounds produced by the same or a similar type of engine and driveline during these events. If the vehicle 100 is driven by an electric motor only, the first and second sounds may be the sounds produced by a high performance engine and driveline during a vehicle launch and a transmission upshift, respectively.

The speaker control module 212 may select each of the first and second sounds from a plurality of sounds produced by the engine 114 and the driveline 122 in the same or similar vehicle operating conditions as the current vehicle operating conditions. For example, the sounds produced by the engine 114 and the driveline 122 and the corresponding vehicle operating conditions may be recorded in a laboratory setting. The recorded vehicle operating conditions may include the gear state, the vehicle speed, the powertrain torque, the engine speed, and/or the vehicle acceleration. The speaker control module 212 may store the recorded sounds and command the speakers 128 to reproduce the recorded sounds when the same or similar vehicle operating conditions are encountered.

Prior to recording the sounds produced by the engine 114 and the driveline 122, the engine 114 and/or the driveline 122 may be modified to enhance the sounds produced by these components. For example, rubber mounts in the engine 114 and the driveline 122 may be replaced with aluminum mounts to increase the magnitude and frequency of the noises produced by the engine 114 and the driveline 122.

The speaker control module 212 controls the speakers 128 to play each of the first and second sounds by instructing the speakers to play a plurality of tones and shaped broadband noise. The tones are played at the same time to yield a complex tone comprised of several tones. Each of the tones is characterized by a frequency. The speaker control module 212 may adjust the frequency of each tone based on the engine speed (or virtual engine speed) and adjust the volume of each tone based on the powertrain torque. For example, the speaker control module 212 may increase the frequency of each tone as the engine speed increases and vice versa, and the speaker control module 212 may increase the volume of each tone as the powertrain torque increases and vice versa.

The shaped broadband noise may be white noise, pink noise, or a noise similar to white or pink noise, and may be limited to a predetermined range, such as a range from 20 hertz (Hz) to 1000 Hz. In addition, the shaped broadband noise may be specific to the particular characteristics of the engine 114 and/or the driveline 122, such as the number of cylinders in the engine 114. For example, the shaped broadband noise may have a power spectral density that matches a power spectral density of sounds produced by the engine 114 and/or the driveline 122 in various vehicle operating conditions.

Figure 3:
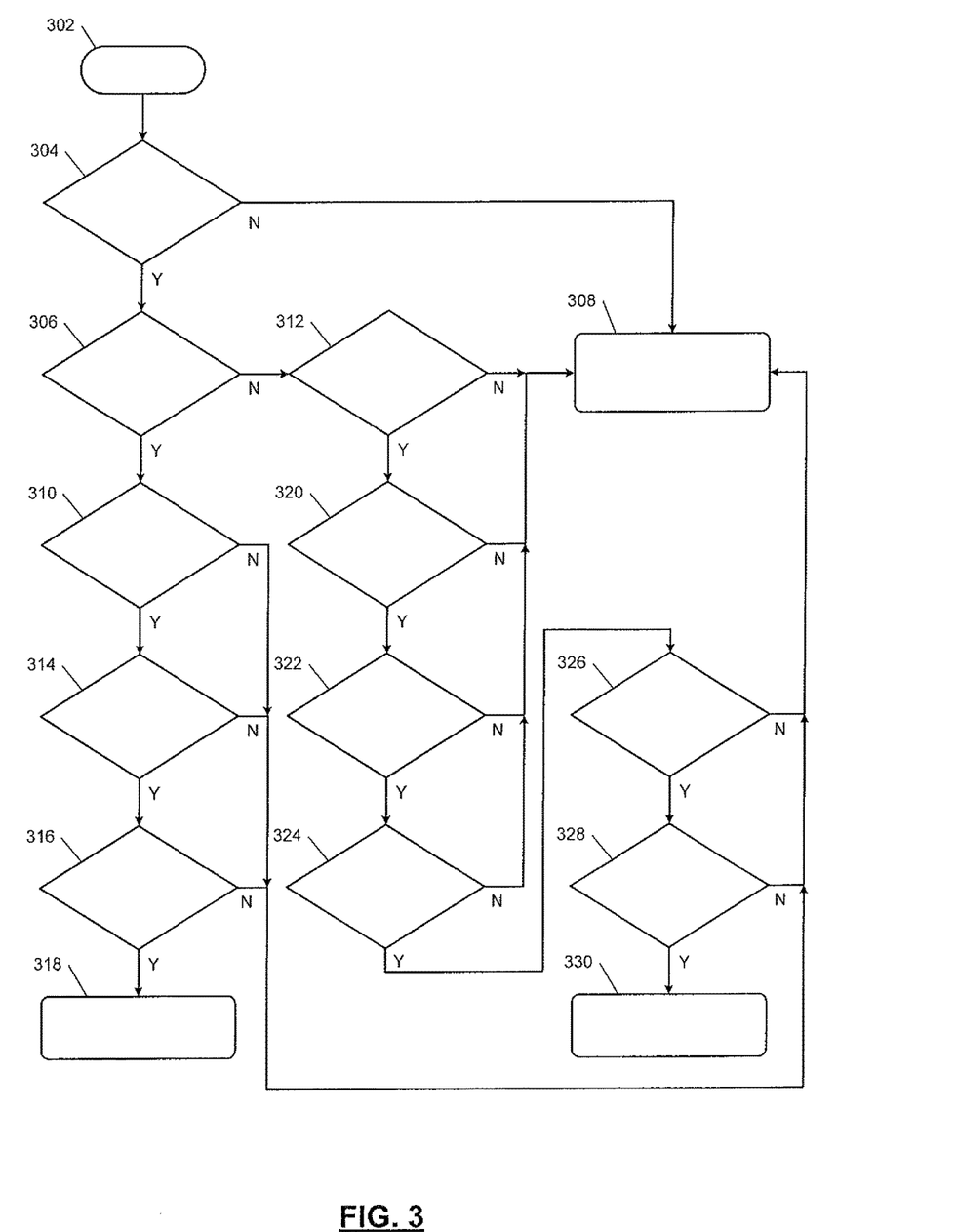
FIG. 3 is a flowchart illustrating a method for controlling the speaker in a cabin of the vehicle to play a sound produced by an engine and/or a driveline during a vehicle launch and a transmission upshift.

Referring now to FIG. 3, an example method for controlling the speakers 128 to play sounds produced by the engine 114 and/or the driveline 122 during a vehicle launch and a transmission upshift begins at 302. The method is described in the context of the modules of FIG. 2. However, the particular modules that perform the steps of the method may be different than the modules mentioned below and/or the method may be implemented apart from the modules of FIG. 2.

At 304, the speaker control module 212 determines whether a driving mode of the vehicle 100 is set to an aggressive mode or a non-aggressive mode. The ECM 130 the TCM 192 may adjust the operation of the engine 114 and the transmission 120, respectively, based on the driving mode of the vehicle 100. For example, the driving mode may affect powertrains sounds, suspension level, traction control, engine calibration, and transmission shift patterns. Examples of an aggressive mode include a track mode and a sport mode, and examples of a non-aggressive mode include a tour mode and a stealth mode. If the driving mode of the vehicle 100 is set to an aggressive mode, the method continues at 306. Otherwise the method continues at 308. At 308, the speaker control module 212 does not control the speakers 128 to play the first sound or the second sound.

At 306, the speaker control module 212 determines whether a vehicle launch is identified. As discussed above, the launch identification module 208 may identify a vehicle launch based on the vehicle speed. For example, the launch identification module 208 may identify a vehicle launch when the vehicle speed increases from zero to a value greater than zero. When a vehicle launch is identified, the method may continue at 310. Otherwise, the method may continue 312.

Also at 306, the speaker control module 212 may determine whether an aggressive vehicle launch is identified. The launch identification module 208 may identify an aggressive vehicle launch based on the vehicle speed and the vehicle acceleration. For example, the launch identification module 208 may identify a vehicle launch when the vehicle speed increases from zero to a value greater than zero, and the speaker control module 212 may determine that the vehicle launch is aggressive when the vehicle acceleration is greater than the first predetermined acceleration. When the identified vehicle launch is aggressive, the method may continue at 310. Otherwise, the method may continue 312.

At 310, the speaker control module 212 determines whether the transmission 120 is in first gear or second gear. If the transmission 120 is in first gear or second gear, the method continues at 314. Otherwise, the method continues at 308.

At 314, the speaker control module 212 determines whether the engine speed is within a predetermined range. If the engine speed is within the predetermined range, the method continues at 316. Otherwise, the method continues at 308.

In various implementations, the speaker control module 212 may determine whether to control the speakers 128 to play the first sound independent of engine speed (or virtual engine speed). For example, the speaker control module 212 may control the speakers 128 to play the first sound when a vehicle launch is identified regardless of the engine speed when the vehicle acceleration is greater than the second predetermined acceleration. In these implementations, 314 may be omitted, or 314 may be skipped if the vehicle acceleration is greater than the second predetermined acceleration.

At 316, the speaker control module 212 determines whether the powertrain torque is greater than a predetermined torque. If the powertrain torque is greater than a predetermined torque, the method continues at 318. Otherwise, the method continues at 308. At 318, the speaker control module 212 controls the speakers 128 to play the first sound.

At 312, the speaker control module 212 determines whether a transmission upshift is identified. As discussed above, the upshift identification module 210 may identify a transmission upshift based on the gear state, the shift status, and/or the gear shift direction, which may be provided by the TCM 192. If a transmission upshift is identified, the method continues at 320. Otherwise, method continues at 308.

At 320, the speaker control module 212 determines whether the vehicle speed is greater than a predetermined speed. If the vehicle speed is greater than a predetermined speed, the method continues at 322. Otherwise, the method continues at 308.

At 322, the speaker control module 212 determines whether the transmission 120 has been upshifted (i.e., whether the transmission upshift is complete). If the transmission 120 has been upshifted, the method continues at 322. Otherwise, the method continues at 308.

At 324, the speaker control module 212 determines whether the current gear state or number of the transmission 120 is less than a predetermined gear number. If the current gear number is less than a predetermined gear number, the method continues at 326. Otherwise, the method continues at 308.

At 326, the speaker control module 212 determines whether the engine speed is within a predetermined range. If the engine speed is within the predetermined range, the method continues at 328. Otherwise, the method continues at 308.

At 328, the speaker control module 212 determines whether the powertrain torque is greater than a predetermined torque. If the powertrain torque is greater than the predetermined torque, the method continues at 330. Otherwise, the method continues at 308. At 330, the speaker control module 212 controls the speakers 128 to play the second sound.

The speaker control module 212 may control the speakers 128 to play each of the first and second sounds for the predetermined period. The speaker control module 212 may stop playing the first sound when the predetermined period expires and/or when one or more conditions used to identify a vehicle launch are no longer satisfied. For example, the speaker control module 212 may stop playing the first sound when the vehicle acceleration is less than the first predetermined acceleration. Additionally or alternatively, the speaker control module 212 may stop playing the first sound when 310, 314, and/or 316 is/are no longer satisfied.

The speaker control module 212 may stop playing the second sound when the predetermined period expires and/or when one or more conditions used to identify a transmission upshift are no longer satisfied. For example, the speaker control module 212 may stop playing the second sound when a period that elapses after the transmission upshift is complete is greater than a predetermined period. Additionally or alternatively, the speaker control module 212 may stop playing the second sound when 320, 322, 324, 326, and/or 328 is/are no longer satisfied.

After 308, 318, or 330, the method may return to 302. In this manner, the method may continuously determine whether a vehicle launch or a transmission upshift is identified, and play the first or second sounds when one of these two events are identified. In addition, the method may monitor various vehicle operating conditions and confirm that the vehicle operating conditions satisfy certain criteria before playing the first and second sounds. Thus, the method may ensure that the first and second sounds are only played when a driver would expect to hear them.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
 a launch identification module configured to:
  monitor a speed of a vehicle; and
  identify a vehicle launch when the vehicle speed increases from zero to a value greater than zero; and
 a speaker control module configured to:
  monitor an acceleration of the vehicle;
  control a speaker in a cabin of the vehicle to play a first sound that simulates a vehicle launch sound produced by at least one of an engine and a driveline when the vehicle launch is identified and the vehicle acceleration is greater than a predetermined acceleration; and
  control the speaker to not play the first sound when the vehicle launch is identified and the vehicle acceleration is less than or equal to the predetermined acceleration.

2. The system of claim 1 further comprising an upshift identification module configured to:
 monitor a shift status of a transmission of the vehicle and a shift direction of the transmission; and
 identify when the transmission is upshifted from one gear to another gear that is greater than the one gear based on the shift status and the shift direction, wherein the speaker control module is configured to control the speaker to play a second sound that simulates a transmission upshift sound produced by at least one of the engine and the driveline when the transmission is upshifted.

3. The system of claim 2 wherein the speaker control module is configured to control the speaker to play the second sound when the transmission is upshifted and the vehicle speed is less than a predetermined speed.

4. The system of claim 2 wherein the speaker control module is configured to control the speaker to play the second sound when the transmission is upshifted and a gear number of the transmission is less than a gear number threshold.

5. The system of claim 2 wherein the speaker control module is configured to control the speaker to play the second sound when the transmission is upshifted, engine speed is within a predetermined range, and an amount of torque produced by a powertrain of the vehicle is greater than a predetermined torque.

6. The system of claim 1 wherein the speaker control module is configured to determine whether to control the speaker to play the first sound independent of engine speed.

7. The system of claim 1 wherein the speaker control module is configured to control the speaker to play the first sound when the vehicle launch is identified and a transmission of the vehicle is in one of first gear and second gear.

8. The system of claim 1 wherein the speaker control module is configured to control the speaker to play the first sound when the vehicle launch is identified and engine speed is within a predetermined range.

9. The system of claim 1 wherein the speaker control module is configured to control the speaker to play the first sound when the vehicle launch is identified and an amount of torque produced by a powertrain of the vehicle is greater than a predetermined torque.

10. The system of claim 1 wherein the speaker control module is configured to:
 control the speaker to play the first sound for a predetermined period; and control the speaker to stop playing the first sound when the predetermined period expires.

11. A method comprising:

monitoring a speed of a vehicle; and identifying a vehicle launch when the vehicle speed increases from zero to a value greater than zero;

monitoring an acceleration of the vehicle;

controlling a speaker in a cabin of the vehicle to play a first sound that simulates a vehicle launch sound produced by at least one of an engine and a driveline when the vehicle launch is identified and the vehicle acceleration is greater than a predetermined acceleration; and controlling the speaker to not play the first sound when the vehicle launch is identified and the vehicle acceleration is less than or equal to the predetermined acceleration.

12. The method of claim 11 further comprising:

monitoring a shift status of a transmission of the vehicle and a shift direction of the transmission;

identifying when the transmission is upshifted from one gear to another gear that is greater than the one gear based on the shift status and the shift direction; and controlling the speaker to play a second sound that simulates a transmission upshift sound produced by at least one of the engine and the driveline when the transmission is upshifted.

13. The method of claim 12 further comprising controlling the speaker to play the second sound when the transmission is upshifted and the vehicle speed is less than a predetermined speed.

14. The method of claim 12 further comprising controlling the speaker to play the second sound when the transmission is upshifted and a gear number of the transmission is less than a gear number threshold.

15. The method of claim 12 further comprising controlling the speaker to play the second sound when the transmission is upshifted, engine speed is within a predetermined range, and an amount of torque produced by a powertrain of the vehicle is greater than a predetermined torque.

16. The method of claim 11 further comprising determining whether to control the speaker to play the first sound independent of engine speed.

17. The method of claim 11 further comprising controlling the speaker to play the first sound when the vehicle launch is identified and a transmission of the vehicle is in one of first gear and second gear.

18. The method of claim 11 further comprising controlling the speaker to play the first sound when the vehicle launch is identified and engine speed is within a predetermined range.

19. The method of claim 11 further comprising controlling the speaker to play the first sound when the vehicle launch is identified and an amount of torque produced by a powertrain of the vehicle is greater than a predetermined torque.

20. The method of claim 11 further comprising:

controlling the speaker to play the first sound for a predetermined period; and controlling the speaker to stop playing the first sound when the predetermined period expires.

* * * * *